Dec. 31, 1946.  W. E. PALMER  2,413,370
WELDING STUD

Filed May 24, 1944

INVENTOR
*Walter E. Palmer*
BY
*Dean Fairbanks Hirsch*
ATTORNEYS

Patented Dec. 31, 1946

2,413,370

UNITED STATES PATENT OFFICE 2,413,370

WELDING STUD

Walter E. Palmer, Fair Lawn, N. J., assignor to Hollup Corporation, Chicago, Ill., a corporation of Illinois Application May 24, 1944, Serial No. 537,033

4 Claims. (Cl. 287—20.2)

This invention relates to studs for electric butt welding to a metal plate or other member, and for various uses, such for instance as the attachment to or spacing of other parts. Where used for the attachment of other parts the stud may be threaded or otherwise formed for receiving a nut or other retainer, but where the stud is for use as a spacer it need not be so formed.

In butt welding a stud in place, any suitable stud welding apparatus may be used, such for instance as shown in the Crecca Patents 2,057,-670, 2,115,707, 2,260,969, 2,307,026 and 2,315,502, or other apparatus of suitable character.

The Crecca reissue patent Re. 22,108, shows a use of such a butt welded stud for the securing or sheathing or planking to the plate carrying the stud.

In common practice an arc initiating material may be used either on the end of the stud or between the stud and the part to which it is to be welded, but with some types of stud welding apparatus this is not necessary.

In electric welding it is common to employ a flux which acts to remove impurities from the weld area and/or to protect the molten metal from oxidation during the forming of the weld. Various devices have been provided for the feeding of such fluxing or like material to the weld area, but most such devices are not suitable for simple butt welding of studs, and particularly if the stud is to be welded in place in a hole formed through a surface planking or sheathing, as shown in Re. 22,108, above referred to.

The main object of the present invention is to provide a simple and effective means for supplying the fluxing material for the butt welding of studs. To accomplish this object I provide as an important feature of my invention an annular collar of the fluxing material encircling and carried by the stud adjacent to the end to be welded, so that as soon as the stud becomes highly heated in the welding operation the flux melts and flows over the weld area and the molten metal.

As a further feature the stud is provided with an annular groove which receives and retains the fluxing material. This groove is preferably formed in the metal of the stud itself, but may be formed between a reduced portion of the stud and a ferrule, sleeve or collar cemented to or friction-tight on the stud, and of some fire-resistant material.

My improved stud may be cylindrical, or of any desired cross-sectional form, but obviously should be cylindrical if threaded to receive a retaining nut. It is preferably pointed, tapered, or of reduced diameter at the terminal portion, and the groove, if in the stud itself, is so disposed that the portion of the stud below the groove is melted away or extended into the molten metal pool formed in the part to which the stud is being welded, so that the groove is filled with molten metal during the welding. Thus, even though the stud to be welded has a portion of reduced diameter or cross-sectional area at the groove, the stud itself after welding is of the full size above the surface to which the stud is welded.

I do not wish to be limited as to the character of the fluxing agent, as any suitable composition commonly employed for analogous purposes may be employed.

In the accompanying drawing there are shown several embodiments of my invention.

Figure 1:
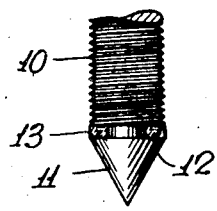
Fig. 1 shows a portion of a stud with a conical end, and the flux receiving groove formed at the base of the conical portion.
Figure 2:
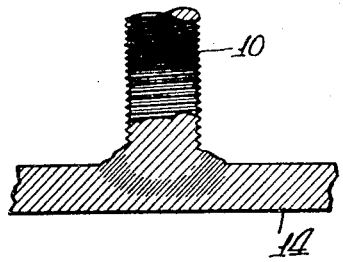
Fig. 2 shows the stud welded to a plate.

The stud 10 shown in Figs. 1 and 2 is of cylindrical shape with a conical terminal portion 11, and with a groove 12 encircling the stud at the base of the conical portion, and filled with a fluxing material 13 which is retained between the upper and lower surfaces of the groove. The stud is shown as being screw threaded. Upon forming an arc between the stud and a plate or other metal member to which the stud is to be attached, a portion of the conical end melts away, and a portion of the plate is likewise melted to form a pool of molten metal. When the heating has been continued for the desired length of time and the proper melting has been effected, the end of the stud is forced into the pool, and the heating is discontinued. The resulting construction will be something as shown in Fig. 2, in which the stud is permanently connected to a plate 14, and the groove of the stud has been entirely eliminated or filled with molten metal.

Figure 3:
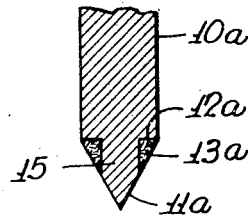
Fig. 3 shows a portion of a stud similar to that shown in Fig. 1, except that the groove surrounds a cylindrical part of the terminal portion of the stud.

In Fig. 3 the stud 10a has a cylindrical portion 15 of smaller diameter than the body of the stud, and terminating in a conical section 11a.

Thus there is formed a groove 12a with a flat upper surface and a cylindrical inner surface. This permits of the use of a somewhat larger amount of flux in the ring 13a, and provides less metal to be melted away in the formation of the weld.

Figure 4:
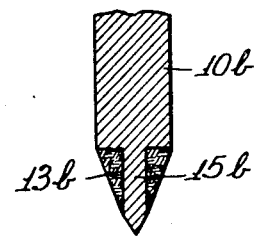
Fig. 4 is a view similar to Fig. 3, but showing the stud further reduced to receive a larger amount of fluxing material.

The construction shown in Fig. 4 is similar to that shown in Fig. 3, except that the stud 10b has a smaller cylindrical portion 15b, so that a still larger amount to flux may be held as a ring 13b, and the amount of metal to be melted away is still less.

Figure 5:
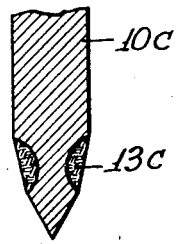
Fig. 5 is a view similar to Fig. 1, but with a different shape of groove.

In Fig. 5 the stud 10c is similar to that shown in Fig. 1, except that the groove is deeper and of greater length, so that a larger amount of fluxing material may constitute the ring 13c.

The constructions shown in Figs. 1 and 5 have the advantage in that there is no liability of the ring of fluxing material slipping off from the stud during shipment or storage. This is because the metal of the stud below the ring is of larger diameter than the inner diameter of the groove. By mixing the proper adhesive with the fluxing material applied as shown in Figs. 3 and 4, the material may be properly retained.

Figure 6:
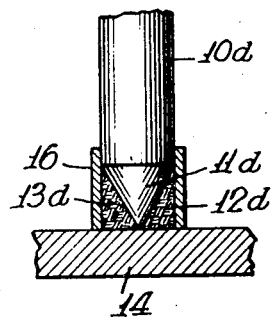
Fig. 6 is a view showing the groove formed between the stud and a surrounding ferrule.

In Fig. 6 the stud 10d may be a standard stud, and it is not necessary to specially form it or to cut any groove therein. The stud has a pointed end portion 11d and has secured to the body of the stud above this pointed end portion a ferrule or sleeve 16 of suitable fire-resistant material. The securing may be by making the connection friction-tight, or by the use of a suitable adhesive. As the ferrule encircles the pointed end, there is formed a groove 12d which receives and retains the annular ring 13d of the fluxing material. When the welding current is passed between the stud and the plate 14, the ferrule will retain its form for a brief interval during which portions of the plate and stud become melted, and the melting of the flux at the same time covers the weld area. The ferrule prevents the flux from flowing away from the weld area until it has served its main purpose.

When the metal parts have been heated to the desired welding temperature the stud may be easily forced into the pool of metal in the plate by sliding through the ferrule or by the breaking or crumbling of the ferrule, or the ferrule itself may actually melt, but at a higher temperature than the fluxing material.

By means of my invention more effective welds may be made, and it is not necessary for the welder to employ any auxiliary parts, and the predetermined and proper amount of fluxing material is supplied for each weld.

Having thus described my invention what I claim as new and desire to secure by Letters Patent is:

1. A stud adapted to be butt welded to a metal plate and having a body portion provided at one end with a substantially cylindrical extension of smaller diameter than said body portion and a tapered terminal portion, and an annular body of fluxing material encircling said extension, below said body portion, and above said tapered portion, of a maximum thickness substantially equal to the difference in the radii of said body portion and said cylindrical extension, and presenting a conical outer surface forming an extension of the surface of said tapered terminal portion.

2. A stud adapted to be butt welded to a metal plate and having a threaded body portion, a cylindrical extension at the end of the body portion and of smaller diameter, and a tapered terminal portion, said stud having an annular body of fluxing material encircling said cylindrical extension and of varying thickness along the length thereof, and having an outside diameter at one end substantially the same as that of the threaded body portion, and an outside diameter at the other end substantially the same as that of the larger end of said tapered terminal portion.

3. A stud adapted to be butt welded to a metal plate and having a threaded portion, an extension portion of lesser diameter and terminating in a point adapted to contact said plate and form an arc to melt away said portion of lesser diameter and form a puddle of molten metal in said plate, and into which said stud may be projected and become welded to said plate, said stud having an annular body of fluxing material around said cylindrical portion and above said pointed end, and of a maximum thickness substantially equal to the difference in diameter of said threaded portion and said portion of lesser diameter.

4. A stud adapted to be welded to a metal plate and having a threaded body portion, a portion of reduced diameter beyond the threaded portion and terminating in a point, and an annular body of fluxing material of substantial thickness encircling said portion of reduced diameter and above said terminal part, whereby said fluxing material may flow over molten metal formed by the melting of said reduced portion and a portion of said plate.

WALTER E. PALMER.